March 24, 1959     T. A. DUKE     2,878,967
DISPOSABLE CONTAINER

Filed Feb. 25, 1953     2 Sheets-Sheet 1

INVENTOR.
Thomas Albert Duke
BY Barthel & Bugbee
Attys

March 24, 1959     T. A. DUKE     2,878,967
DISPOSABLE CONTAINER
Filed Feb. 25, 1953     2 Sheets-Sheet 2
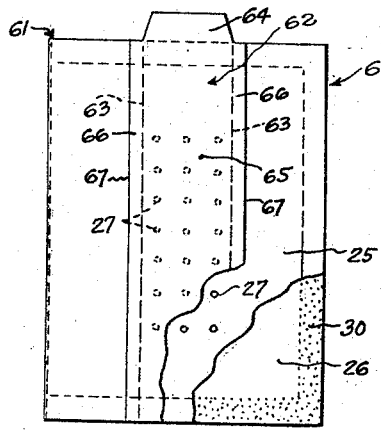
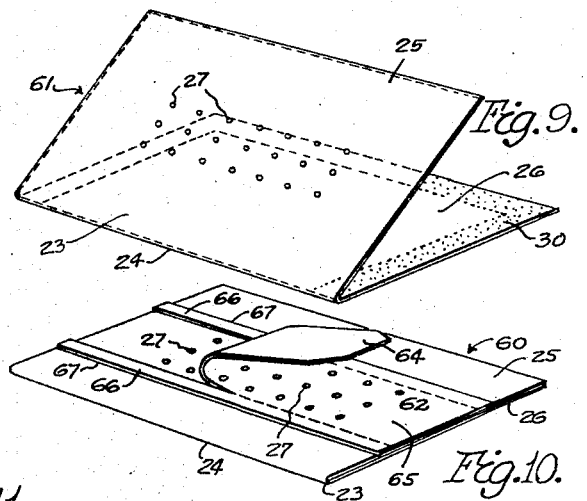
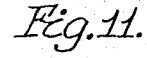
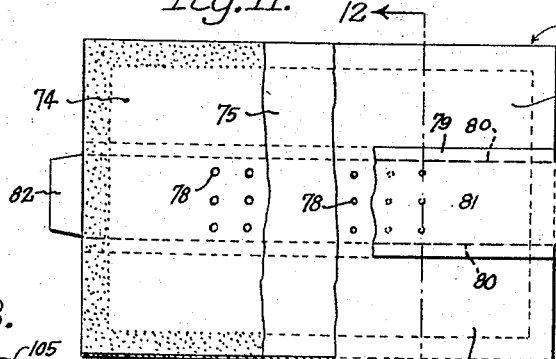
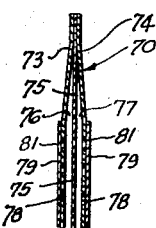
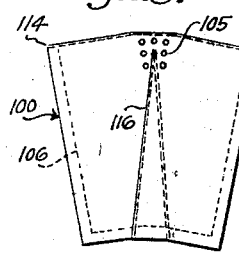
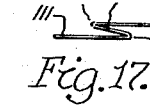
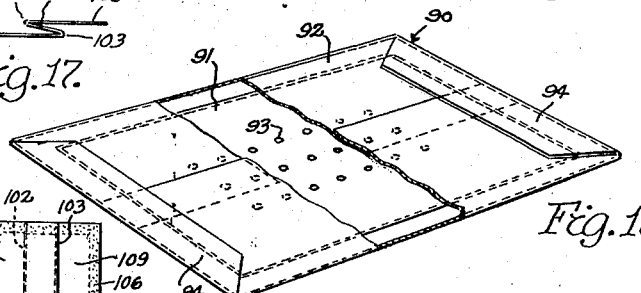
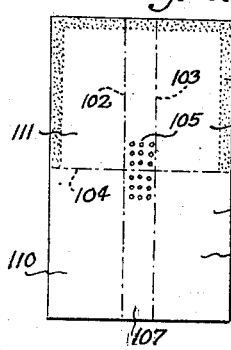
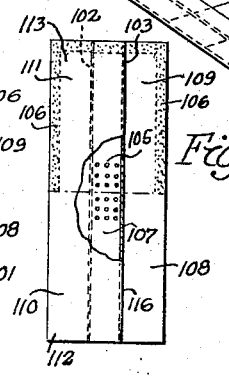
INVENTOR.
Thomas Albert Duke
BY Barthel & Bugbee
Attys

United States Patent Office 2,878,967
Patented Mar. 24, 1959

2,878,967

DISPOSABLE CONTAINER

Thomas Albert Duke, Detroit, Mich.

Application February 25, 1953, Serial No. 338,763

2 Claims. (Cl. 222—107)

This invention relates to containers and, in particular, to disposable containers.

One object of this invention is to provide a disposable container for use in restaurants, dining cars, aircraft and other places where a small quantity of granulated or powdered material, such as pepper, salt, sugar or the like is supplied to patrons, the invention providing an inexpensive container for such materials which may be thrown away after use.

Another object is to provide a disposable container of the foregoing character which is made from sheet material, such as paper, thin sheet plastic material or the like, preferably moisture-proof, which is suitably perforated and folded for the purpose.

Another object is to provide a disposable container of the foregoing character wherein the perforations are normally covered but are easily uncovered by the patron or customer, either by removing a cover strip or envelope, or by unfolding a portion of the container which is folded over the perforations in order to temporarily cover them before use.

Another object is to provide a disposable container of the foregoing character wherein a single container is provided with a partition so that it can simultaneously hold two different kinds of materials, such as, for example, both pepper and salt.

Other objects and advantages of the invention will become apparent during the course of the following description of the accompanying drawings, wherein:

Figure 8 is a top plan view of a second modification of the invention wherein the perforations of the container are covered by a removable strip;

Figure 9 is a perspective view of the receptacle of the container of Figure 8, before applying the perforation covers;

Figure 10 is a perspective view of the container of Figure 8, with the cover strip partly torn away to reveal the perforations;

Figure 11 is a top plan view of a third modification of the invention consisting of a double compartment container with a partition therein permitting simultaneous holding of two separate and different materials, with the left-hand portions successively broken away to reveal the underlying portion;

Figure 12 is a cross-section taken along the line 12—12 in Figure 11;

Figure 13 is a perspective view of a fourth modification of the invention wherein the perforated inner receptacle is enclosed within an imperforate outer receptacle, both receptacles being in the form of envelopes;

Figure 14 is a top plan view of a fifth modification of the invention wherein the perforated container is folded over on itself to cover the perforations, which are subsequently uncovered by partially unfolding;

Figure 15 is a top plan view of the container of Figure 14, prior to making the first fold;

Figure 16 is a top plan view of the container of Figure 15, after making the first fold but prior to making the second fold to complete the container of Figure 14;

Figure 17 is an end elevation of the container shown in Figure 16; and

Figure 18 is a top plan view of the container of Figure 14 after being partially unfolded to uncover the perforations.

Figure 1:
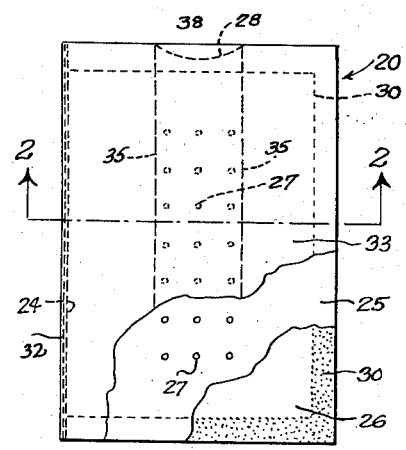
Figure 1 is a top plan view of a disposable container, according to one form of the invention, with the lower right-hand corner portion successively broken away to disclose the underlying portions thereof.
Figure 2:
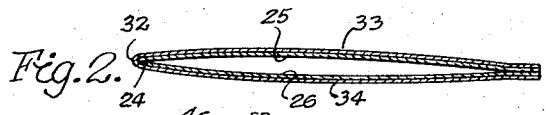
Figure 2 is a cross-section taken along the line 2—2 in Figure 1.

In general, the disposable container of the present invention consists of a packet or envelope of sheet material having one or more perforations in one of its opposed walls covered temporarily by a removable cover portion or strip of sheet material. Referring to the drawings in detail, Figures 1 and 2 show a disposable container, generally designated 20, for condiments or other materials, preferably powdered or granulated, according to one form of the invention, and made up of inner and outer receptacles, generally designated 21 and 22 respectively, and separately shown in Figures 3 and 4 respectively. The inner receptacle 21 consists of a rectangular piece of sheet material 23 folded in halves along a fold line 24 into upper and lower leaves 25 and 26 respectively. The upper leaf 25 is provided with perforations 27 arranged in any suitable form, preferably in a rectangular path, and both upper and lower leaves 25 and 26 are optionally provided with arcuate indentations or notches 28 and 29 respectively to facilitate tearing the outer receptacle 22 without interfering with the inner receptacle 21, as described more fully below. One or both of the leaves 25 or 26 is provided with a band 30 of adhesive, either of the dry or the tacky type, extending around the three open sides of the leaf, or the adhesive may be omitted where heat-sealable sheet material is used, such as certain well-known sheet plastics.

The outer receptacle 22 also consists of a rectangular sheet 31 folded along a fold line 32 to form upper and lower leaves 33 and 34 and of sufficient size to enclose the inner receptacle 21. The upper leaf 33 is preferably provided with parallel weakening lines 35 spaced apart from one another a sufficient distance to lie on opposite sides of the path of perforations 27, so as to provide a tear strip 36 which is slightly wider than the path of perforations 27 and overlying the latter, when the device is assembled. The lower leaf 34, like the lower leaf 26 of the inner receptacle 21, is provided with a band of similar adhesive 37 extending around the open edges of the leaf from one end of the fold line 32 to the other end thereof. The adhesive band 37 may obviously be placed on either or both of the leaves 33 and 34 or heat-sealing may be used where applicable.

In assembling the disposable container 20 of Figures 1 and 2, the inner container 21 is filled with a sufficient quantity of the condiment, such as salt, and then sealed at its edges by means of the band of adhesive 30. The inner receptacle 21 is then placed inside the outer receptacle 22 and the outer leaves 33 and 34 brought together against the inner leaves 25 and 26 in sealing relationship (Figure 2). It will be obvious, of course, that the outer receptacle 22 may be placed over and sealed to the inner receptacle 21 while the two are in the open condition shown in Figures 3 and 4, after which the material to be dispensed may be inserted in the inner container 21 and the whole then brought together and sealed as in Figure 2.

In the use of the form of the invention shown in Figures 1 to 4 inclusive, the person desiring salt, for example, grasps the end portion 38 of the tear strip 36 where it overlies the indentations or notches 28 and 29 and tears the strip 36 along the weakened lines 35, thereby revealing the perforations 27. The user then shakes the sale or other material therein out of the container 20 through the perforations 27 and throws away the container 20 when he has finished with it.

Figure 7:
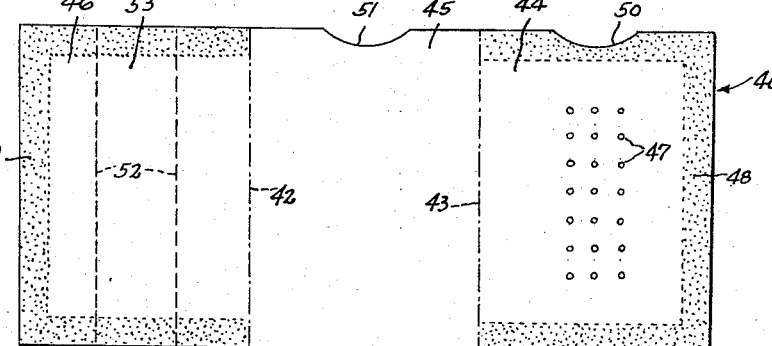
Figure 7 is a top plan view of the blank from which the container of Figures 5 and 6 is formed by folding and sealing.
Figure 5:
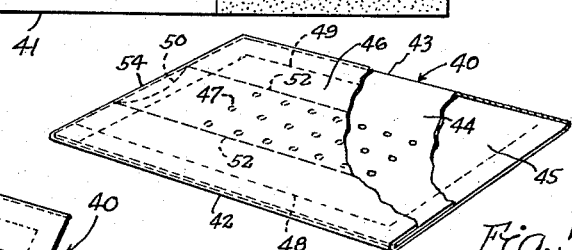
Figure 5 is a perspective view of a modified disposable container made from a single triple-folded piece of material, the corner portion of the figure being successively broken away to disclose the underlying portions thereof.
Figure 6:
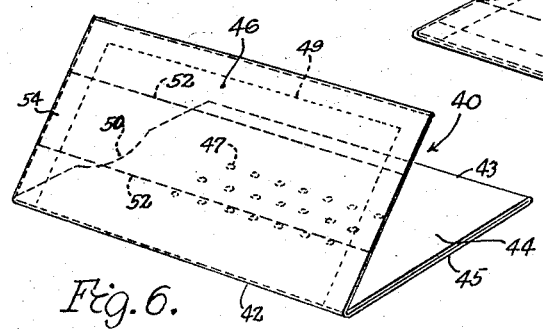
Figure 6 is a perspective view of the container of Figure 5 in its partially folded condition.

The modified disposable container, generally designated 40, shown in Figures 5 to 7 inclusive, consists of a single sheet 41 of paper, plastic or other suitable material which is provided with two spaced parallel fold lines 42 and 43 to form three leaves 44, 45 and 46. One end leaf 44 is provided with a group of perforations 47, and both end leaves 44 and 46 are provided with bands of adhesive 48 and 49 extending around three sides of the respective leaves 44 and 46. The end leaf 44 and middle leaf 45 are also provided with arcuate indentations or notches 50 and 51 so aligned with one another that when the end leaf 44 is folded along the fold line 43, the notch 50 will coincide with the notch 51. When this fold has been made, or before it, a suitable quantity of condiment, such as salt, is placed on the middle leaf 45 or between the middle and end leafs 45 and 44 and the end leaf 44 folded down upon the middle leaf 45 and secured thereto by the adhesive band 48. The opposite end leaf 46 which has previously been provided with parallel weakened tear lines 52 forming a tear strip 53 wider than the outermost rows of perforations 47, is then folded along the fold line 42 over the perforated end leaf 44 and secured thereto by the adhesive band 49. When this is done, the three leaves 44, 45 and 46 are disposed in the positions shown in Figure 5, with the tear strip 53 lying over the perforations 47.

To use the device 40, the user grasps the end portion 54 of the tear strip 53 immediately above the aligned indentations or notches 50, 51, and tears the strip 53 along the weakened tear lines 52 across the leaf 46 until the perforations 47 are partially or wholly exposed. The user then shakes out the salt or other condiment in the quantity desired, and discards the entire container 40 when he has finished with it.

Figure 3:
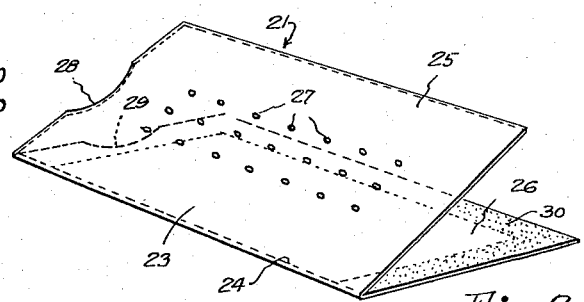
Figure 3 is a perspective view of the inner receptacle of the container of Figure 1.
Figure 4:
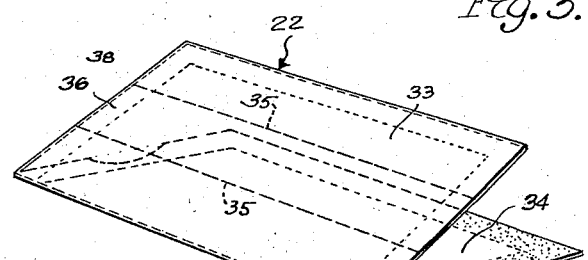
Figure 4 is a perspective view of the outer receptacle of the container of Figure 1.

The modified disposable container, generally designated 60, shown in Figures 8, 9 and 10, consists of a receptacle 61 of substantially the same construction as the receptacle 21 of Figure 3, except that the indentations or notches 28 and 29 have been omitted, hence corresponding parts bear the same reference numerals. Superimposed upon the path of perforations 27 in the receptacle 61 is an elongated cover strip, generally designated 62, having parallel weakened tear lines 63 sufficiently far apart to lie on opposite sides of the outermost rows of perforations 27. The cover strip 62 is optionally provided at one end with a tear tab 64 forming the end of a tear strip 65 lying between the weakened tear lines 63. The cover strip 62 is secured to the perforated leaf 25 of the receptacle 61 by adhesives placed along the inner surfaces of the band-like zones 66 lying between the tear lines 63 and the outer side edges 67 of the cover strip 62. The receptacle 61 is filled with salt or other condiment or material in the same manner as was described previously in connection with Figures 1 to 4 inclusive, and sealed.

To use the disposable container 60, the user grasps the tab 64 between the fingers of one hand while he holds the receptacle 61 with the other hand, and tears the tear strip 65 back upon itself along the weakened tear lines 63 (Figure 10), exposing as many of the perforations 27 as he considers necessary to provide him with the desired amount of material. He then shakes the material out through the perforations 27 and, as before, discards the container 60 when he has finished with it.

The modified disposable container, generally designated 70, shown in Figures 11 and 12, consists of a sheet 71 folded along the fold line 72 to form opposite leaves 73 and 74 between which is placed an imperforate inner leaf or partition leaf 75 (Figure 12), so as to form separate compartments 76 and 77 respectively. Each of the leaves 73 and 74 is provided with perforations 78 arranged in a path covered by a cover strip 79 similar to the cover strip 62 and similarly having weakened tear lines 80 forming a tear strip 81 with an end tab 82. As before, the tear strips 81 are wider than the groups of perforations 78 which they cover, so as to reveal the perforations 78 when the tear strip 81 is torn away. The cover strip 79 is secured by adhesive or by heat-sealing in the same manner as the cover strip 62 of Figure 8.

Before the leaves 73 and 74 are secured to the partition leaf 75, the materials to be dispensed, such as salt and pepper, are placed on opposite sides of the partition leaf 75, after which the edges of the outer leaves 73 and 74 are sealed to the edges of the partition leaf 75, forming the compartments 76 and 77 containing the two different materials.

To use the disposable container 70, the user graps either or both of the tabs 82, which are located at opposite ends of the device, and tears it or them away as before, revealing either or both of the groups of perforations 78 in the leaves 73 and 74. If a person uses salt, but does not use pepper, for example, he needs only to remove one of the tear strips 81 whereas both salt and pepper are available if he removes both tear strips.

The modified disposable container, generally designated 90, shown in Figure 13, consists of inner and outer envelopes 91 and 92 respectively, and constructed in the same manner. The inner envelope 91 is provided with perforations 93 and, after being filled with the desired quantity of material to be dispensed, is enclosed in the outer envelope 92 by the usual means, such as by sealing one of the end tabs 94 thereof. To expose the perforations 93, the user merely tears away or rips apart the outer envelope 92, uncovering either only a part of the perforations or exposing the entire inner envelope 91, as desired. The manner of using the device is the same as described above.

The modified disposable container, generally designated 100, shown in Figures 14 to 18 inclusive, consists of a sheet 101 of suitable material such as paper or plastic, which is provided with spaced parallel longitudinal fold lines 102 and 103 and a transverse fold line 104. The sheet 101 is provided with perforations 105 which may, if desired, extend over the fold line 104. In th event that the sheet 101 is not made of heat-sealable material, such as certain well-known plastic sheets, a band or path of adhesive 106 is placed around the edges of half of the sheet 101.

To form the container 100, the sheet 101 is first folded along the fold lines 102 and 103 to cause the central band 107 containing the perforations 105 to be folded over upon the panels 108 and 109 on the right-hand side of the fold line 103 and on opposite sides of the fold line 104 (Figure 16) leaving the panels 110, 111 exposed on top and the opposite ends of the folded-over portion 107 being adhesively secured to the edge portions of the adjacent wall, namely the panels 108 and 109. The sheet, with the pleat 116 formed in this manner by the band 107, is then folded along the transverse fold line 104 and the granulated material to be dispensed is placed between the halves, whereupon the half 112 formed by the panels 110 and 108 and one portion of the band 107 is secured to the opposite half 113 formed by the panels 109 and 111 and the remaining portion of the band 107 either by heat-sealing, if feasible, or by the use of the adhesive band 106. The finally folded container 100 resulting from these operations is shown in Figure 14.

To use the container 100, the user merely pulls apart the opposite corners 114 and 115 at opposite ends of the fold line 104 (Figure 14), unfolding the upper part of the pleat 116 and exposing the perforations 105 (Figure 18). The material inside the container 100 may then be shaken out as desired.

It will be apparent that the disposable container of the present invention may also be used to dispense material or a substance in the form of a paste, such as tooth paste, or shaving cream or cosmetic creams. In such a use, a single perforation may be used, in place of the multiple perforations described above. The multiple-perforation container may also be used for dispensing powdered cosmetics, such as face powder.

What I claim is:

1. A disposable container comprising an envelope of sheet material having a pair of opposed side walls disposed face-to-face and sealed to one another at their edges, said opposed side walls having a band-shaped pleat-like folded-over portion extending lengthwise thereof, one of said side walls having perforations in a part of said envelope extending inwardly from one edge thereof beneath said pleat-like folded-over portion for expulsion of the substance to be dispensed, said band-shaped pleat-like folded-over portion of said envelope being disposed substantially perpendicular to the edge of the envelope adjacent said perforations, a part of said pleat-like portion being easily movable laterally without tearing from a folded-over perforation-closing position superimposed in face-to-face relationship with the adjacent perforated portion of said last-mentioned side wall to a perforation-opening position beside the perforation-closing position thereof.

2. A disposable container comprising an envelope of sheet material having a pair of opposed side walls disposed face-to-face and sealed to one another at their edges, said opposed side walls having a band-shaped pleat-like folded-over portion extending lengthwise thereof, one of said side walls having perforations in a part of said envelope extending inwardly from one edge thereof beneath said pleat-like folded-over portion for expulsion of the substance to be dispensed, said band-shaped pleat-like folded-over portion of said envelope being disposed substantially perpendicular to the edge of the envelope adjacent said perforations, a part of said pleat-like portion being easily movable laterally without tearing from a folded-over perforation-closing position superimposed in face-to-face relationship with the adjacent perforated portion of said last-mentioned side wall to a perforation-opening position beside the perforation-closing position thereof, the opposite ends of the pleat-like folded-over portion being adhesively secured to the adjacent edge portions of its respective side wall, and the central part of said pleat-like folded-over portion loosely and slidably engaging the adjacent central portion of its respective side wall whereby to selectively cover and uncover said perforations.

References Cited in the file of this patent

UNITED STATES PATENTS

| | | |
|---|---|---|
| 1,123,010 | Richardson | Dec. 29, 1914 |
| 1,401,324 | Dority et al. | Dec. 27, 1921 |
| 1,514,371 | Clough | Nov. 4, 1924 |
| 2,296,951 | Rosen et al. | Sept. 29, 1942 |
| 2,325,942 | Drake | Aug. 3, 1943 |
| 2,389,747 | Stone et al. | Nov. 27, 1945 |
| 2,527,919 | Drangle | Oct. 31, 1950 |